United States Patent [19]

Yang

[11] Patent Number: 6,038,669
[45] Date of Patent: Mar. 14, 2000

[54] PLC HAVING POWER FAILURE COMPENSATION FUNCTION AND POWER FAILURE COMPENSATION METHOD

[75] Inventor: Seong Woon Yang, Anyang, Rep. of Korea

[73] Assignee: LG Industrial Systems Co., Ltd., Seoul, Rep. of Korea

[21] Appl. No.: 08/988,807

[22] Filed: Dec. 11, 1997

[30] Foreign Application Priority Data

Dec. 17, 1996 [KR] Rep. of Korea ....................... 96-66647

[51] Int. Cl.[7] ...................................................... G06F 1/00
[52] U.S. Cl. .......................... 713/300; 713/320; 713/330; 713/340
[58] Field of Search ......................... 395/750.01, 750.02, 395/750.03, 750.04, 750.05, 750.06, 750.07, 750.08; 713/300, 310, 320, 322, 323, 324, 330, 340

[56] References Cited

U.S. PATENT DOCUMENTS

| | | | |
|---|---|---|---|
| 5,283,792 | 2/1994 | Davies, Jr. et al. ....................... | 371/66 |
| 5,410,713 | 4/1995 | White et al. ............................. | 395/750 |
| 5,546,589 | 8/1996 | Odaira ..................................... | 395/750 |

*Primary Examiner*—Ayaz R. Sheikh
*Assistant Examiner*—Tim Vo
*Attorney, Agent, or Firm*—Oliff & Berridge, PLC

[57] ABSTRACT

A PLC having a power failure compensation function and a power failure compensation method which are capable of implementing the continuity of a program operation when a power failure occurs. The PLC includes a first storing unit for storing a program execution data and a user's program executed by the CPU, a power failure detector for checking a state of an alternating current power and outputting a power failure generation signal, a program counter for counting each step of a program executed by the CPU, a second storing unit for storing a count value of the program counter which is the program step value that the CPU finally executes before the power failure, a third storing unit for storing an execution result value of a program obtained in the program step that the CPU finally executes before the power failure, a battery for supplying a direct current power to the second and third storing unit, respectively, and a CPU for reading the step value of the program executed before the power failure from the program counter and storing the thusly read value into the second storing unit, storing the execution result value of the program finally executed before the power failure into the third storing unit, reading the user's program stored in the first storing unit and the data stored in the second and third storing unit, and executing the user's program from the next step of the finally executed program step.

1 Claim, 4 Drawing Sheets

| | | |
|---|---|---|
| step1: | LD | A |
| step2: | JMPN | LABEL1 |
| step3: | LD | B |
| step4: | ADD | 1 |
| step5: | ST | B |
| step6: | LD | C |
| step7: | ADD | 2 |
| step8: | ST | C |
| step9: | LD | D |
| step10: | ADD | 3 |
| step11: | ST | D |
| step12: | LABEL1:END | |

FIG. B

PLC HAVING POWER FAILURE COMPENSATION FUNCTION AND POWER FAILURE COMPENSATION METHOD

BACKGROUND OF THE INVENTION

1. Field of the Invention

The present invention relates to a PLC (Programmable Logic Controller) having a power failure compensation function and a power failure compensation method, and in particular to an improved PLC having a power failure compensation function and a power failure compensation method which are capable of implementing the continuity of a program operation when a power failure occurs.

2. Description of the Background Art

The PLC (Programmable Logic controller) is an apparatus for controlling electrical switches (input and output contact points) such as a manufacturing automation system, etc. which is connected with the PLC based on the program which is set by a user.

The PLC system adapts a LAN (Local Area Network), which is capable of communicating data in real time, and a multi-drop (1:N communication) in which multiple communication stations are connected with one network.

Therefore, in the factory automation system, the PLCs which are installed in each line receives/transmits the data of each line such as the number of packages, the number of errors, the number of output products, etc. from/to the PLC, so that the system is operated in accordance with the data received.

As shown in FIG. 1, the conventional PLC includes an electric power unit 10 for supplying an electric power to elements of the system, a CPU (Central Processing Unit) 11 which operates in accordance with the program set by a user, an input unit 12 for providing the data processed by a control target 14, which is controlled, and an output unit 13 for outputting a control signal from the CPU 11 to the control target 14.

The operation of the conventional PLC will now be explained with reference to the accompanying drawings.

The electric power unit 10 converts an AC input power into a DC power and supplies to the CPU 11 and the input and output units 12 and 13, and the CPU 11 reads a state of the control target 14 through the input unit 12, performs the program made by a user, and outputs through the output unit 13. The PLC controls the control target 14 in the above-described method.

In addition, the PLC repeatedly performs the program made by the user, and updates a result thereof into a data memory of the PLC. The data memory stores the content of the memory by a battery during a power failure. Therefore, in the PLC operation mode, the user determines whether the data value is stored in the memory data in accordance with the characteristic of the control target 14 which is to be controlled for operating the PLC.

While the user sets the mode for storing the data value and operates the PLC, if a power failure occurs and then the execution of the program is stopped due to the power failure, the data which is initially set to be stored may be different with the data which is obtained by normally executing the program.

As a result of the operation, a different operation result may be produced in accordance with the position where the program is stopped due to the power failure. In addition, when re-operating the PLC, since the CPU 11 re-executes the program from the first step of the user's program using the operation result which is obtained until the program is stopped, the continuity of the program execution is not obtained before and after the power failure.

FIG. 2 illustrates the user's program which is executed by the PLC.

The user's program consists of Step 1 through Step 12. Namely, the program is designed to add 1, 2 and 3 to the contact points B, C and D, respectively, when the contact point A is turned on. At this time, A denotes a bool value, and B, C and D are integer values and are set to be stored.

First, the user's program is normally performed from Step 1 to Step 12, the integer values B, C and D become 5, 10 and 15, respectively, and the next expressions of C=2*B, D=3*D are obtained based on the above-described values.

If the user's program is normally performed from Step 1 to Step 12 four times, and then a power failure occurs just before performing Step 8 during the fifth operation, the operation values 5, 8 and 12 which are obtained until Step 7 are stored into the data memory as the integer values of 5, 8 and 12.

If the power failure is recovered, the CPU 11 reads the values of B, C and D stored in the data memory, and the program is performed from Step 1 without performing the program from the step stopped due to the power failure. Therefore, the integer values of B, C and D which are obtained after the program is performed five times become 6, 10 and 15, respectively, and the operation values do not satisfy the equation of C+2*B, D=3*B, so that the operation of the PLC may be erroneously performed.

Namely, in the conventional PLC, since the continuity of the user's program is not maintained before/after the power failure, there may occur a malfunction of the PLC.

SUMMARY OF THE INVENTION

Accordingly, it is an object of the present invention to provide a PLC having a power failure compensation function and a power failure compensation method which overcome the aforementioned problems encountered in the background art.

It is another object of the present invention to provide a PLC having a power failure compensation function and a power failure compensation method which are capable of implementing the continuity of a program operation when a power failure occurs.

To achieve the above objects, there is provided a PLC having a power failure compensation function which includes a first storing unit for storing a program execution data and a user's program executed by the CPU, a power failure detector for checking a state of an alternating current power and outputting a power failure generation signal, a program counter for counting each step of a program executed by the CPU, a second storing unit for storing a count value of the program counter which is the program step value that the CPU finally executes before the power failure, a third storing unit for storing an execution result value of a program obtained in the program step that the CPU finally executes before the power failure, a battery for supplying a direct current power to the second and third storing unit, respectively, and a CPU for reading the step value of the program executed before the power failure from the program counter and storing the thusly read value into the second storing unit, storing the execution result value of the program finally executed before the power failure into the third storing unit, reading the user's program stored in the first storing unit and the data stored in the second and third storing unit, and executing the user's program from the next step of the finally executed program step.

To achieve the above objects, there is provided a power failure compensation method which includes the steps of detecting a power failure generation signal from the power failure detector and judging a power failure, reading a step value of a program, which is finally executed before the power failure, from the program counter in accordance with a result of the judgement, storing the thusly read step value into the second execution unit, and storing an execution result value of the program, which is finally executed before the power failure, into the third storing unit, judging whether the power failure occurs during the operation of the PLC when the power failure is recovered, and reading a user's program from the first storing unit when the power failure occurred as a result of the judgement, reading data from the second and third storing unit, and executing a user's program from the next step of the program step which is finally executed.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5A through 5C are waveform diagrams illustrating operational timing signals from the power failure detection unit of FIG. 4.

DETAILED DESCRIPTION OF THE PREFERRED EMBODIMENTS

Figure 3:
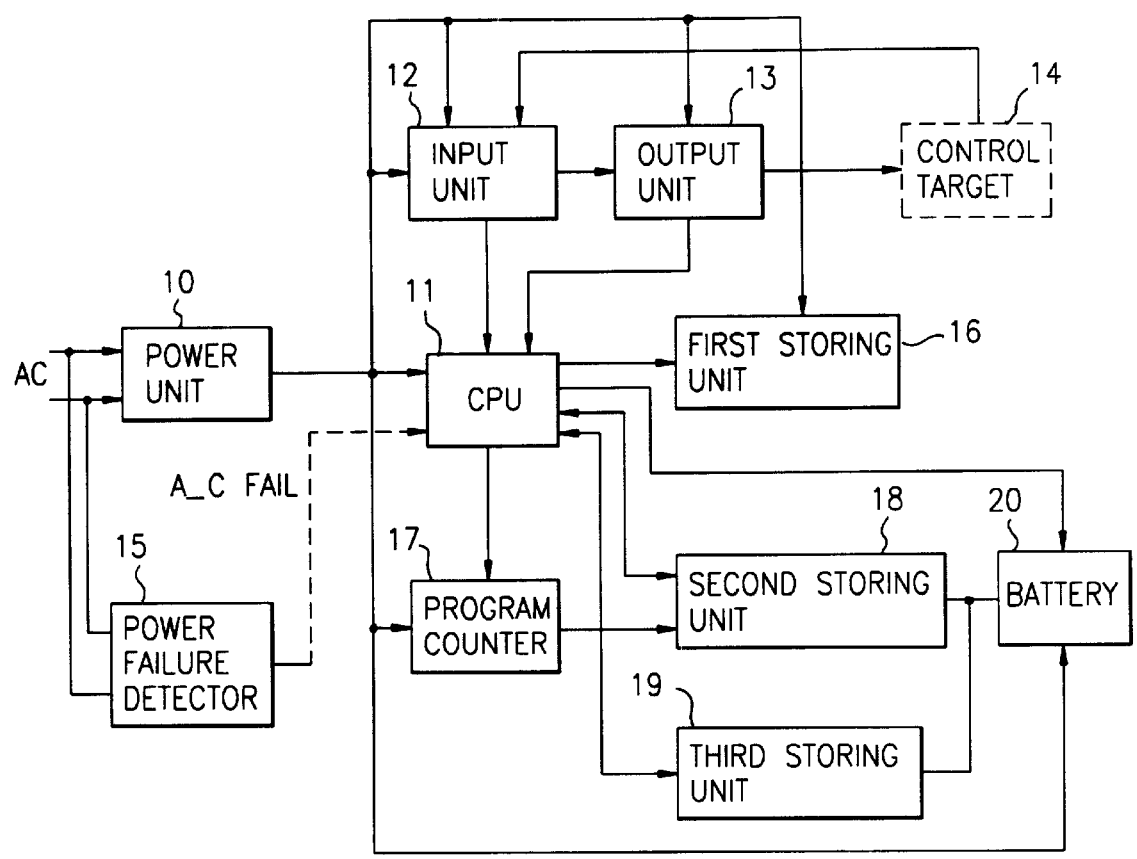
FIG. 3 is a block diagram illustrating a power failure compensation apparatus for a PLC according to the present invention.
Figure 4:
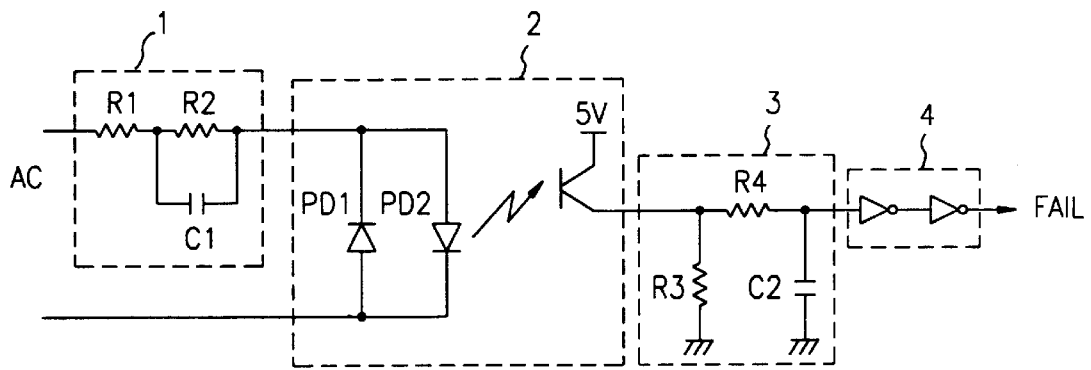
FIG. 4 is a detailed circuit diagram illustrating the power failure detection unit of FIG. 3.

As shown in FIG. 3, the PLC (Programmable Logic Controller) having a power failure compensation function according to the present invention includes a power failure detector 15 for detecting the state of an alternating current voltage, a first storing unit 16 for storing the program execution data of the user's program executed by the CPU 11 and a user's program, a program counter 17 for counting the steps of the program executed by the CPU 11, a second storing unit 18 for storing the count value of the program counter 17 that the CPU 11 finally executes until the power failure, a third storing unit 19 for storing the execution result value of the program obtained in the program step that the CPU 11 finally executes until the power failure, and a battery 20 for supplying a direct current voltage to the second and third storing units 18 and 19, respectively.

The power failure detector 15 includes an impedance unit 1 having resistors R1 and R2 and a condenser C1, a photo-coupler 2 having two photo-diodes PD1 and PD2 and one photo-transistor, a charging/discharging unit 3 having resistors R3 and R4 and a condenser C2 for charging/discharging a voltage 5V from the photo-coupler 2, and a buffer unit 4 for buffering the voltage charged/discharged by the charging/discharging unit 3.

The operation of the PLC having a power failure compensation function according to the present invention will now be explained with reference to the accompanying drawings.

The power failure detector 15 detects an alternating current voltage applied to the input terminal and outputs a power failure generation signal $AC_{13}FAIL$.

When the AC power is inputted, the photo-coupler 2 is turned on by the inputted AC power, and then the voltage of 5 V is charged into the condenser C2 through the resistor R4, so that a high level power failure generation signal $AC_{13}FAIL$ is outputted through the buffer unit 4.

In addition, when the AC power is not inputted, the photo-coupler 2 is turned off, so that the electric charges charged in the condenser C2 are discharged through the resistors R4 and R3, and a low level power failure generation signal $AC_{13}FAIL$ is outputted through the buffer unit 4.

Figure 5A:
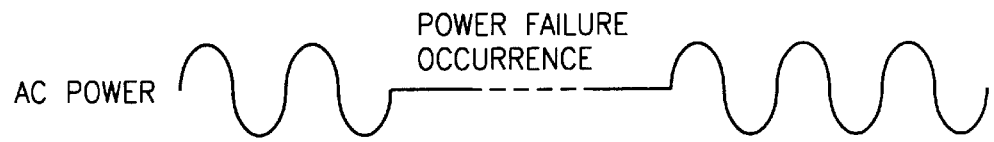
Figure 5A:
Figure 5C:
Figure 6:
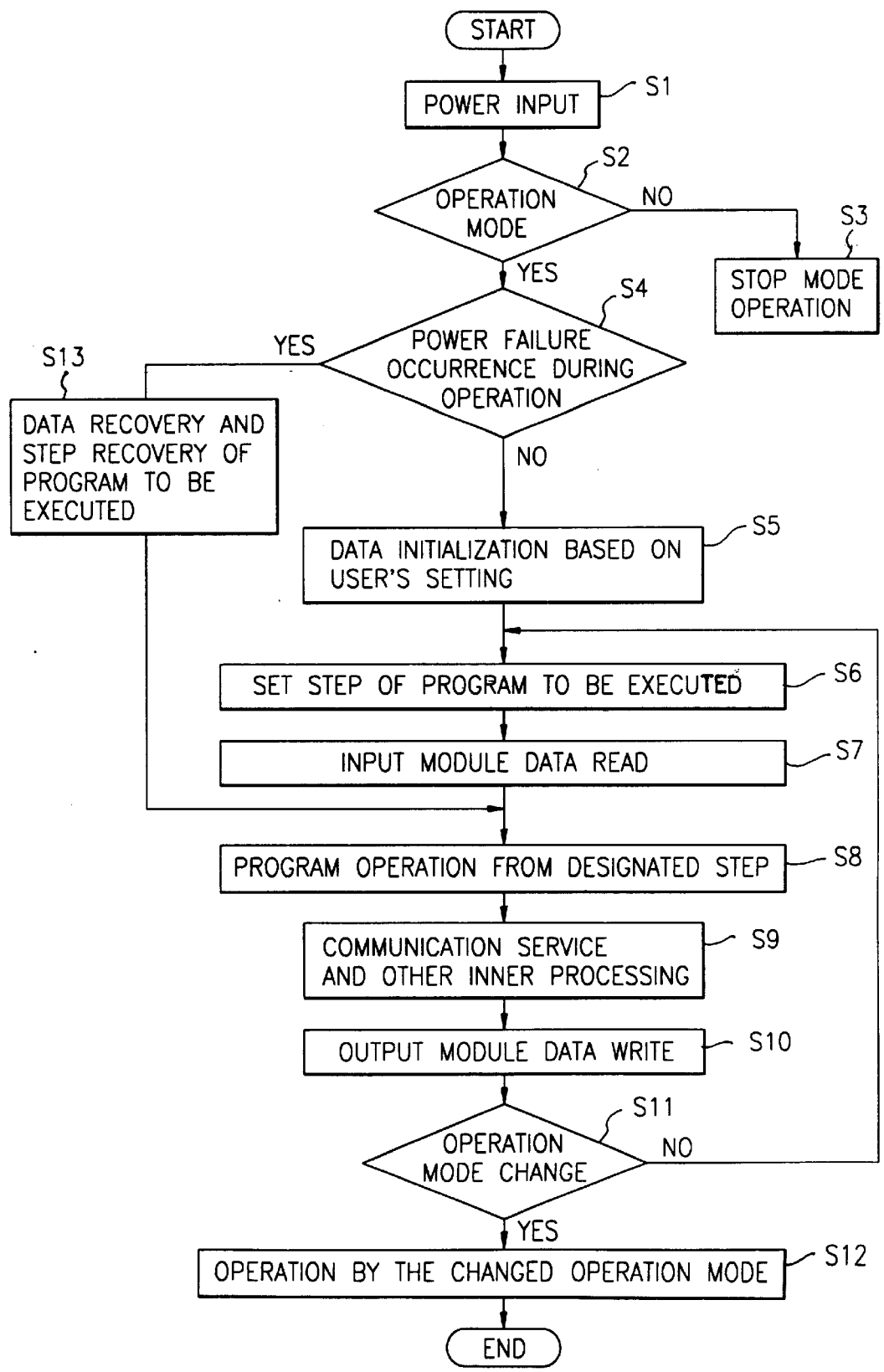
FIG. 6 is a flow chart illustrating an operation of the power failure compensation apparatus for the PLC of FIG. 3.

As shown in FIG. 5a, when the power failure occurs, the power failure detector 15 outputs a low level power failure generation signal $AC_{13}FAIL$ to the CPU 11, which indicates the occurrence of the power failure before the CPU 11 is reset.

First, when an electric power is supplied to the power unit 10, the CPU 11 judges whether the mode of the PLC is the run mode in Step S2. As a result of the judgement, if the PLC mode is in the run mode, it is judged that whether the power failure occurred during the operation in Step S4. As a result of the judgement, if the power failure did not occur during the operation, the data is initialized in accordance with the user's program read from the first storing unit 16, and Steps 1 through 12 of the program to be performed are set in Steps S5 and S6.

In addition, the data is read from the input module (not shown) of the control target 14 through the input unit 12, and the user's program is performed from the set step, and a result of the operation is transferred to the PLCs located in another line, and is stored in the first storing unit 16 and outputs a control data to the output module of the control target through the output unit 13 in Steps S7 through S10. When the operation mode is changed, the PLC is operated using the changed operation mode, and if the operation mode is not changed, the operations after Step 36 are repeatedly performed. At this time, the program counter 17 counts the steps of the program which is executed by the CPU 11.

In addition, if the power failure occurs, when a low level power failure generation signal $AC_{13}FAIL$ from the power failure detector 15 is inputted, the CPU 11 receives the power failure generation signal $AC_{13}FAIL$ as an interrupt signal, and the user's program is stopped. The program execution result value of the program which is obtained from the program step which is finally executed before the power failure is stored in the third storing unit 19 and then is reset as shown in FIG. 3C.

In addition, the CPU 11 controls the program counter 17 and stores the program step value which is finally processed before the power failure into the second storing unit 18. An emergency power is supplied to the second and third storing units 18 and 19 by controlling the battery 20. At this time, the second third storing units 18 and 19 is composed of a RAM having a battery or a RAM connected with a back-up battery.

Thereafter, when the electric power is supplied, the CPU 11 judges whether the power failure occurs during the operation in Steps S1 through S4. As a result of the judgement, if the power failure occurs during the operation of the PLC, a predetermined data is recovered from the third storing unit 19. The program step value which is finally performed before the power failure is read from the second storing unit 18, and the program step is designated as a step at the time of the power failure in Steps S4 and S13. Thereafter, the CPU 11 executes the user's program from the step at the time of the power failure using the recovered data from the second storing unit 18, and then the operation is repeatedly performed after Step S8.

Figures 1, 2:
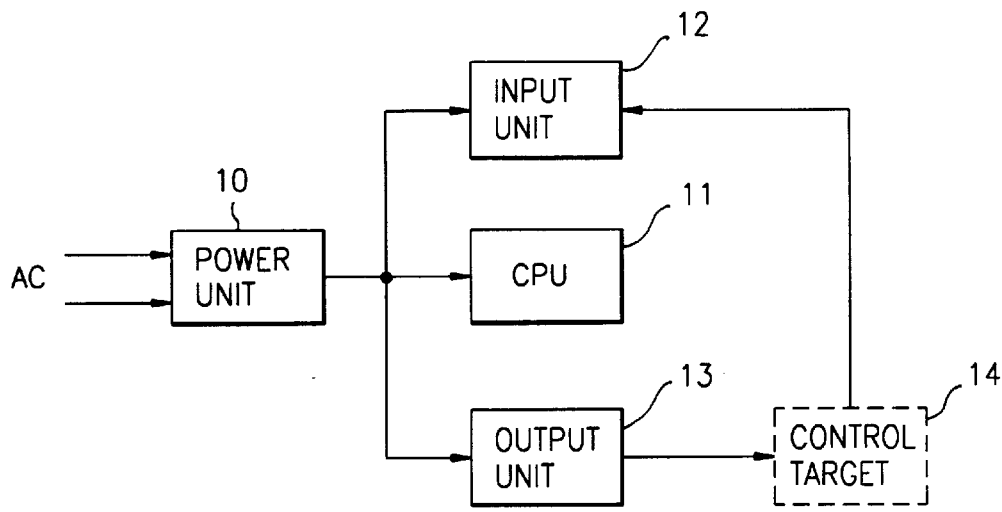
FIG. 1 is a block diagram illustrating a conventional PLC (Programmable Logic Controller)
FIG. 2 is a view illustrating a user's program which is performed by a PLC.

The operation will now be explained with reference to the user's program shown in FIG. 2.

First, when the user's program is normally performed five times from Step 1 through Step 12 using the user's program and data read from the first storing unit 16, and the integer values b, C and D become 5, 10 and 15, respectively, and the equation of C=2*B, D=3*B is obtained.

When the user's program is normally and repeatedly performed four times from Step 1 to Step 12, and the power failure occurs before Step 8 when performing the fifth operation, the operation values 5, 8 and 12 which are obtained until Step 7 are stored into the third storing unit 19 as the integer values B, C and D. The count value 8 of the program counter 17 is stored into the second storing unit 18.

Thereafter, when the electric power is recovered, the CPU 11 reads the values B, C and D stored in the third storing unit 19 and the count value 8 stored in the second storing unit 18. The program is executed from Step 8, in which the operation is stopped due to the power failure, to Step 12. Therefore the integer values B, C and D become 5, 10 and 15 and the equation of C=2*B, D=3*B is satisfied thereby.

Therefore, in the present invention, when the electric power is recovered after the power failure occurs, the data which is processed just before the power failure is recovered, and the operation of the PLC is re-performed based on the user's program stopped due to the power failure, whereby it is possible to secure the continuity of the user's program.

As described above, in the present invention, the data obtained during the operation of the user's program and a predetermined step of the user's program which is stopped due to the power failure are stored into the storing unit before the same are reset. When the power failure is recovered, the data and user's program are read from the storing unit, and the user's program is executed from the step in which the operation is stopped, whereby the continuity of the user's program is implemented, and the operational stability of the PLC is secured.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A power failure compensation method for a PLC wherein the PLC includes a first storing means for storing a data and a user's program obtained when a CPU executes a user's program, a power failure detection means for checking a state of an alternating current power and outputting a power failure generation signal, a program counter for counting each step of a program executed by the CPU, a second storing means for storing a count value of the program counter which is the program step value that the CPU finally executes before the power failure, a third storing means for storing an execution result value of a program obtained in the program step that the CPU finally executes before the power failure, a battery for supplying a direct current power to the second and third storing means, respectively, and a CPU for reading the step value of the program executed before the power failure from the program counter and storing the thusly read value into the second storing means, storing the execution result value of the program finally executed before the power failure into the third storing means, reading the user's program stored in the first storing means and the data stored in the second and third storing means, and executing the user's program from the next step of the finally executed program step, comprising the steps of:

detecting a power failure generation signal from the power failure detector and judging a power failure;

reading a step value of a program, which is finally executed before the power failure, from the program counter in accordance with a result of the judgment, storing the thusly read step value into the second execution means, and storing an execution result value of the program, which is finally executed before the power failure, into the third storing means;

judging whether the power failure occurs during the operation of the PLC when the power failure is recovered; and reading a user's program from the first storing means when the power failure occurred during the operation of the PLC as a result of the judgment, reading data from the second and third storing means, and executing a user's program from the next step of the program step which is finally executed; and initializing the data in accordance with the user's program read from the first storing unit and setting total steps of the program if the power failure has not occurred during the operation of the PLC.

* * * * *